United States Patent [19]

Hasegawa

[11] Patent Number: 4,940,104
[45] Date of Patent: Jul. 10, 1990

[54] POWER-ASSISTED STEERING APPARATUS

[75] Inventor: Akira Hasegawa, Susono, Japan

[73] Assignee: Toyota Jidosha Kabushiki Kaisha, Japan

[21] Appl. No.: 370,684

[22] Filed: Jun. 23, 1989

[30] Foreign Application Priority Data

Jun. 24, 1988 [JP] Japan .............................. 63-84404[U]

[51] Int. Cl.⁵ .............................................. B62D 5/06
[52] U.S. Cl. ..................................... 180/132; 180/148; 92/166; 92/167
[58] Field of Search ................ 180/148, 132, 140, 146, 180/147; 92/166, 167, 165 R, 165 PR; 74/388 PS; 16/2, 108

[56] References Cited

U.S. PATENT DOCUMENTS

| | | | |
|---|---|---|---|
| 3,293,994 | 12/1966 | Napolitano | 92/165 R |
| 4,127,186 | 11/1978 | Koyano et al. | 180/148 |
| 4,248,138 | 2/1981 | Akkerman | 92/166 |

FOREIGN PATENT DOCUMENTS

| | | |
|---|---|---|
| 5546051 | 9/1953 | Japan . |
| 58-139374 | 9/1983 | Japan . |
| 61-115773 | 6/1986 | Japan . |
| 61-115774 | 6/1986 | Japan . |
| 61-153677 | 9/1986 | Japan . |
| 61-295172 | 12/1986 | Japan . |
| 2185452 | 7/1987 | United Kingdom ................ 180/132 |

Primary Examiner—Charles A. Marmor
Assistant Examiner—A. M. Boehler
Attorney, Agent, or Firm—Oliff & Berridge

[57] ABSTRACT

A power-assisted steering apparatus of the type which includes a control valve arranged to control hydraulic fluid under pressure supplied to a hydraulic power cylinder from a hydraulic pump therethrough in response to the driver's steering effort applied thereto, the power cylinder having a piston mounted therein for reciprocating movement and a piston rod supporting thereon the piston for movement therewith and extending outwardly from the cylinder in opposite directions. In the steering apparatus, a pair of axially spaced cylindrical reaction pistons are slidably mounted on the piston rod at the both sides of the power cylinder piston in such a manner as to be engageable at their inner ends with a pair of axially spaced internal end walls of the cylinder and at their outer ends with a pair of axially spaced retainer members on the piston rod when the power cylinder piston is retained in a neutral position.

4 Claims, 2 Drawing Sheets

POWER-ASSISTED STEERING APPARATUS

BACKGROUND OF THE INVENTION

1. Field of the Invention

The present invention relates to a power-assisted steering apparatus for wheeled vehicles, and more particularly to a power-assisted steering apparatus of the type which includes a control valve arranged to control hydraulic fluid under pressure supplied to a power cylinder therethrough from a hydraulic pump in response to the driver's steering effort applied thereto.

2. Description of the Prior Art

In such conventional power-assisted steering apparatuses as described above, various improvements have been proposed to eliminate detrioration in a return characteristic of the steering wheel. In Japanese Utility Model Early Publication No. 55-46051, for example, there has been proposed a power-assisted steering apparatus of the type which includes a return mechanism for mechanically effecting return movement of the steering wheel to a neutral position under the load of a spring assembled therein. In Japanese Patent Early Publication Nos. 61-115773 and 115774, there has been proposed a power-assisted steering apparatus of the type which includes a changeover valve arranged to apply hydraulic pressure to the power cylinder in a return direction when the steering wheel is returned to a neutral position.

In the former steering apparatus, however, a reaction force of the spring increases in accordance with an increase of the operation amount of the steering wheel, resulting in an increase of the driver's steering effort against the spring. In the latter steering apparatus, it is required to provide a sensor for detecting return movement of the steering wheel toward the neutral position and an actuator for effecting operation of the changeover valve in response to a signal from the sensor. This results in an increase of the manufacturing cost of the steering apparatus.

SUMMARY OF THE INVENTION

It is, therefore, a primary object of the present invention to provide a power-assisted steering apparatus wherein the piston of a power cylinder is promptly returned to a neutral position under a back pressure applied thereto from a control valve when the steering wheel is returned to its neutral position.

Another object of the present invention is to provide a power-assisted steering apparatus, having the above-mentioned characteristic, wherein the back pressure from the control valve acts to restrict the axial movement of the piston rod of the power cylinder during straight travel of the vehicle.

According to the present invention, the objects are attained by providing a power-assisted steering apparatus of the type which includes a control valve arranged to control hydraulic fluid under pressure supplied to a hydraulic power cylinder from a hydraulic pump therethrough in response to the driver's steering effort applied thereto, the power cylinder having a piston mounted therein for reciprocating movement and a piston rod supporting thereon the piston for movement therewith and extending outwardly from the cylinder in opposite directions, wherein a pair of axially spaced cylindrical reaction pistons are slidably mounted on the piston rod at the both sides of the power cylinder piston in such a manner as to be engageable at their inner ends with a pair of axially spaced internal ends walls of the cylinder and at their outer ends with a pair of axially spaced retainer members on the piston rod when the power cylinder piston is retained in a neutral position.

BRIEF DESCRIPTION OF THE DRAWINGS

Other objects, features and advantages of the present invention will be readily appreciated from the following detailed description of a preferred embodiment thereof when considered with reference to the accompanying drawings, in which.

DESCRIPTION OF THE PREFERRED EMBODIMENT

Figure 1:
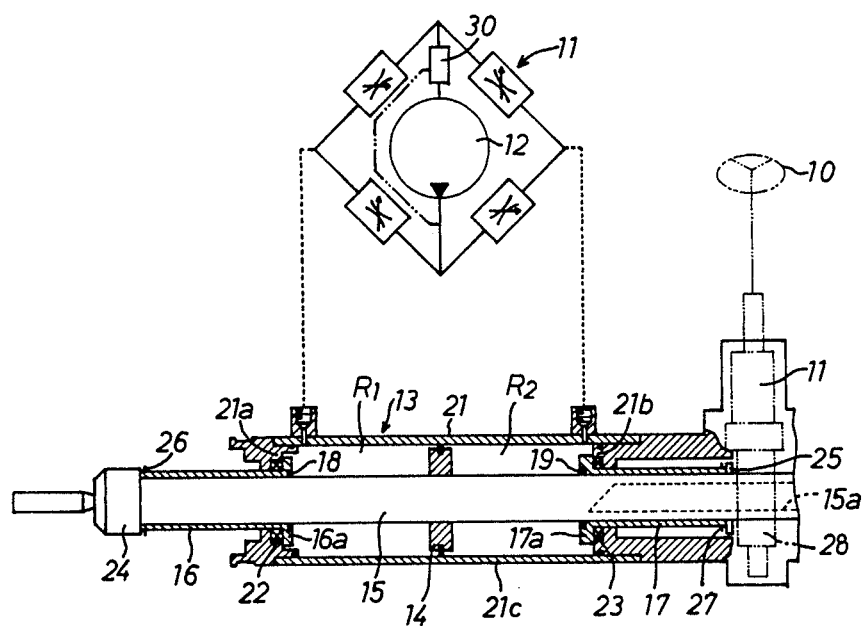
FIG. 1 is a schematic illustration of a power-assisted steering apparatus in accordance with the present invention, wherein a power cylinder is shown in section.

In FIG. 1 of the drawings, there is schematically illustrated a power-assisted steering apparatus of the rack and pinion type for wheeled vehicles, wherein for convenience' sake a control valve 11 in operative connection to a steering wheel 10 is shown separately from a hydraulic circuit of the steering apparatus. The control valve 11 is arranged in a usual manner to control hydraulic fluid under pressure supplied to a hydraulic power cylinder 13 therethrough from a hydraulic pump 12 in response to the driver's steering effort applied to the steering wheel 10. Thus, the power cylinder 13 is operated under control of the control valve 11 to assist the driver's steering effort applied to the steering wheel 10.

In the steering apparatus, a pair of axially spaced cylindrical reaction pistons 16 and 17 are slidably mounted on a piston rod 15 of power cylinder 13 in a liquid-tight manner through annular oil seals 18, 19. The piston rod 15 is in the form of a rack member integrally provided thereon with a piston 14 of power cylinder 13. The reaction pistons 16, 17 are integrally formed at their inner ends with annular flanges 16a, 17a which are placed in the interior of a cylinder body 21 to be engaged with internal end walls 21a, 21b of cylinder body 21. The reaction pistons 16, 17 are axially slidably coupled with the end walls of cylinder body 21 in a liquid-tight manner through annular oil seals 22, 23 and extend outwardly from the cylinder body 21 in opposite directions. When the piston 14 is retained in a neutral position as shown in FIG. 1, the reaction pistons 16, 17 are engaged at their outer ends with a pair of axially spaced retainer members provided on the rack member 15 for movement therewith and engaged at their inner ends with the internal end walls 21a, 21b of cylinder body 21. In the power cylinder 13, the left-hand retainer member is in the form of a ball joint 24 integral with the rack member 15, while the right-hand retainer member is in the form of a radial pin 25 fixed to the rack member 15. A pair of axially spaced snap rings 26, 27 are fixed to the respective outer end portions of reaction pistons 16, 17 to restrict inward displacements of pistons 16, 17 into the interior of cylinder body 21 by engagement with their end walls.

Figure 2:
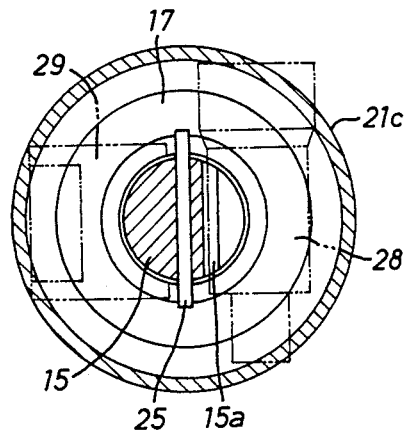
FIG. 2 is an enlarged cross-sectional view illustrating a relationship among the gear part of a rack member, a pinion gear and a rack guide and also illustrating a relationship among a tubular part of the power cylinder, a reaction piston and a retainer pin.
Figure 3:
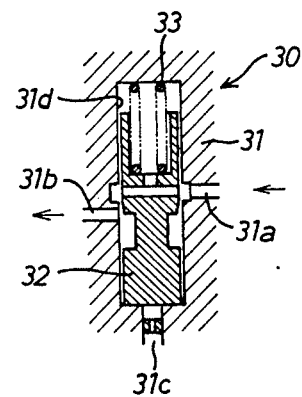
FIG. 3 is an enlarged sectional view of a back pressure control valve shown in FIG. 1.

As shown in FIG. 2, the rack member 15 has a gear part 15a in meshing engagement with a pinion gear 28 and is supported in place by means of a rack guide 29 in a usual manner to maintain the engagement of gear part 15a with the pinion gear 28. In FIG. 2 there are also illustrated the relative positions of a tubular part 21c of cylinder body 21, the rack member 15, reaction piston 17 and radial pin 25. As shown in FIGS. 1 and 3, a back pressure control valve 30 is disposed downstream of the control valve 11 to modulate a back pressure created in the control valve 11 in accordance with the discharge pressure of hydraulic pump 12.

The back pressure control valve 30 includes a valve body 31 formed with an inlet port 31a connected to an outlet port of control valve 11, an outlet port 31b connected to a reservoir of hydraulic pump 12, a pilot port 31c connected to a discharge port of hydraulic pump 12, and an internal bore 31d in open communication with the ports 31a, 31b and 31c, a valve spool 32 axially movable in the internal bore 31d of valve body 31, and a compression spring 33 disposed within the valve body 31 to bias the valve spool 32 toward the pilot port 31c. When the steering wheel 10 is maintained in its neutral position during straight travel of the vehicle or returned to its neutral position from its steered position, the discharge pressure of hydraulic pump 12 is maintained at a low level. In such a condition, the valve spool 32 is positioned under the load of spring 33 to produce a predetermined back pressure upstream of the inlet port 31a. When the discharge pressure of hydraulic pump 12 increases in response to operation of the steering wheel 10, the valve spool 32 is displaced by the discharge pressure against the load of spring 33 to decrease the back pressure in accordance with an increase of the discharge pressure.

In a condition where the predetermined back pressure is maintained under control of the back pressure control valve 30 during straight travel of the vehicle, the piston 14 of power cylinder 13 is retained in its neutral position under the back pressure applied thereto from the control valve 11 through opposite fluid chambers $R_1$, $R_2$, while the reaction pistons 16, 17 are engaged at their outer ends with the ball joint 24 and radial pin 25 and at their inner ends with the internal end walls 21a, 21b of cylinder body 21 under the back pressure in fluid chambers $R_1$, $R_2$. Thus, the axial movement of rack member 15 is restricted by the back pressure acting on the piston 14 and reaction pistons 16, 17. This is effective to reduce flutter, kick back, shimmy or the like of the vehicle and to ensure the straight drivability of the vehicle.

Figure 4:
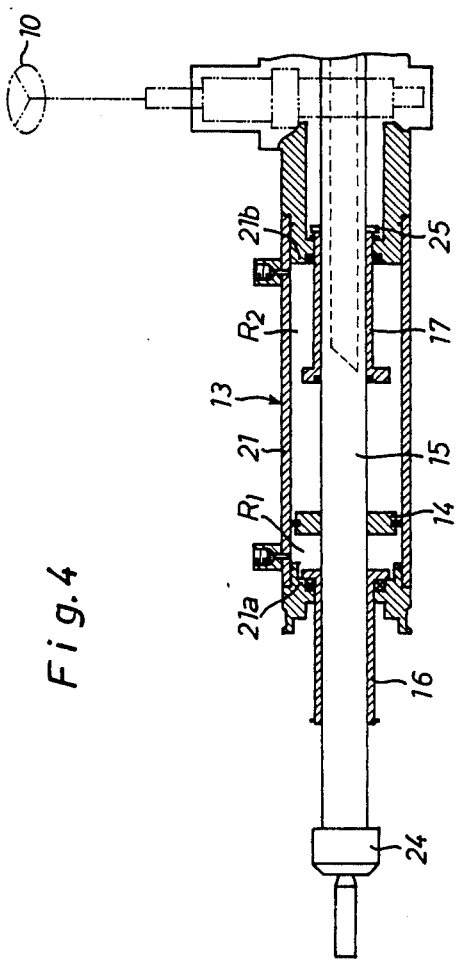
FIGS. 4 and 5 illustrate displaced positions of the reaction pistons in operation of the power cylinder.
Figure 5:
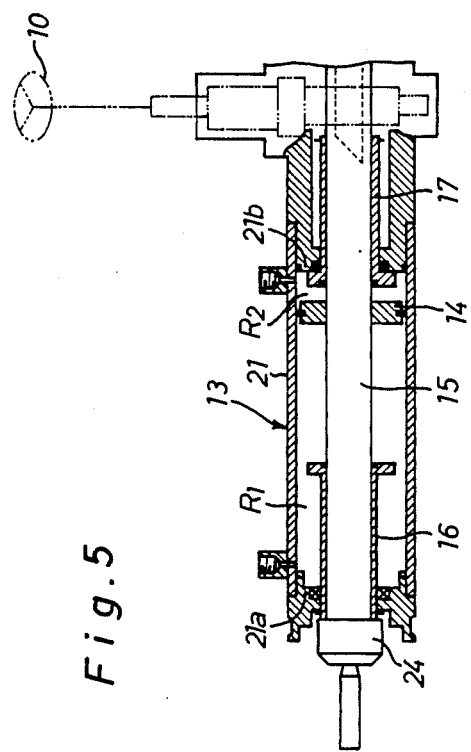

When the steering wheel 10 is steered in a rightward or leftward direction as shown in FIGS. 4 and 5, the piston 14 and rack member 15 are moved leftward or rightward by a hydraulic assist power caused by the hydraulic fluid under pressure selectively supplied into the fluid chambers $R_2$ or $R_1$ under control of the control valve 11, while the reaction piston 17 or 16 is selectively pushed into the cylinder body 21 by engagement with the radial pin 25 or ball joint 24 and disengaged from the internal end wall 21b or 21a of cylinder body 21. In this instance, the other reaction piston 16 or 17 is retained in place by engagement with the internal end wall 21a or 21b of cylinder body 21.

When the steering wheel 10 is returned to its neutral position, both the fluid chambers $R_1$, $R_2$ of power cylinder 13 are applied with the back pressure from the control valve 11 under control of the back pressure control valve 30. In this instance, the back pressure acting on one face of piston 14 is offset with the same back pressure acting on the other face of piston 14, and the back pressure acting on the reaction piston 16 or 17 in engagement with the internal end wall 21a or 21b of cylinder body 21 is received by the cylinder body 21. Thus, the back pressure acting on the reaction piston 17 or 16 causes the piston 14 and rack member 15 to move toward their neutral positions. This is effective to promptly return the steering wheel 10 to its neutral position.

In the above embodiment, the reaction pistons 16, 17 are arranged to be engaged at their outer ends with the retainer members 24, 25 on rack member 15 and at their inner ends with the internal end walls 21a, 21b of cylinder body 21 when the piston 14 is retained in its neutral position. In a practical embodiment of the present invention, a predetermined clearance may be provided between the outer ends of reaction pistons 16, 17 and the retainer members 24, 25 on rack member 15 or between the inner ends of reaction pistons 16, 17 and the internal end walls 21a, 21b of cylinder body 21. In the case that a predetermined clearance is provided between the inner ends of reaction pistons 16, 17 and the internal end walls 21a, 21b of cylinder body 21, the back pressure acting on the reaction pistons 16, 17 is effective to retain the rack member 15 in its neutral position during straight travel of the vehicle. In the case that a predetermined clearance is provided between the outer ends of reaction pistons 16, 17 and the retainer members 24, 25 on rack member 15, a non-sensitive region can be obtained on the rack member 15 during straight travel of the vehicle. This is effective to prevent overshooting of the steering wheel in its return operation and to reduce friction of the steering wheel during straight travel of the vehicle.

Although in the above embodiment the back pressure control valve 30 is provided to produce the predetermined back pressure acting on the reaction pistons 16, 17, appropriate restriction means may be provided in the discharge passage of control valve 11 to produce the back pressure.

Having now fully set forth both structure and operation of a preferred embodiment of the concept underlying the present invention, various other embodiments as well as certain modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power-assisted steering apparatus of the type which includes a control valve arranged to control hydraulic fluid under pressure supplied to a hydraulic power cylinder from a hydraulic pump therethrough in response to the driver's steering effort applied thereto, said power cylinder having a piston mounted therein for reciprocating movement and a piston rod supporting thereon said piston for movement therewith and extending outwardly from said cylinder in opposite directions, wherein a pair of axially spaced cylindrical reaction pistons are slidably mounted on said piston rod one at each end of said power cylinder in such a manner as to be axially engageable at their inner ends with a pair of axially spaced internal end walls of said cylinder and at their outer ends with a pair of axially spaced retainer members on said piston rod when said power cylinder piston is retained in a neutral position.

2. A power-assisted steering apparatus as recited in claim 1, wherein said reaction pistons are arranged to be engaged at their inner ends with the internal end walls of said cylinder and at their outer ends with the retainer members on said piston rod when said power cylinder piston is retained in the neutral position.

3. A power-assisted steering apparatus as recited in claim 1, wherein said reaction pistons each are integrally formed at their inner ends with an annular flange which is placed in the interior of said cylinder to be engageable with the corresponding internal end wall of said cylinder.

4. A power-assisted steering apparatus as recited in claim 1, wherein said piston rod is in the form of a rack member in drive connection to a pinion gear associated with said control valve.

* * * * *